(12) United States Patent
Boss et al.

(10) Patent No.: US 8,756,509 B2
(45) Date of Patent: Jun. 17, 2014

(54) VISUALLY REPRESENTING AND MANAGING ACCESS CONTROL OF RESOURCES

(75) Inventors: Gregory J. Boss, Saginaw, MI (US); Andrew R. Jones, Round Rock, TX (US); Charles S. Lingafelt, Durham, NC (US); Kevin C. McConnell, Austin, TX (US); John E. Moore, Jr., Brownsburg, IN (US)

(73) Assignee: International Business Machines Corporation, Armonk, NY (US)

( * ) Notice: Subject to any disclaimer, the term of this patent is extended or adjusted under 35 U.S.C. 154(b) by 503 days.

(21) Appl. No.: 13/191,564

(22) Filed: Jul. 27, 2011

(65) Prior Publication Data
US 2013/0031480 A1 Jan. 31, 2013

(51) Int. Cl.
*G06F 3/048* (2013.01)

(52) U.S. Cl.
USPC .......................................... 715/738; 715/736

(58) Field of Classification Search
CPC combination set(s) only.
See application file for complete search history.

(56) References Cited

U.S. PATENT DOCUMENTS

| | | | | |
|---|---|---|---|---|
| 6,564,212 B2* | 5/2003 | Koskas | | 707/603 |
| 7,127,467 B2* | 10/2006 | Yalamanchi et al. | | 1/1 |
| 7,139,811 B2* | 11/2006 | Lev Ran et al. | | 709/217 |
| 7,536,396 B2* | 5/2009 | Johnson et al. | | 1/1 |
| 7,681,131 B1* | 3/2010 | Quarterman et al. | | 715/736 |
| 8,336,078 B2* | 12/2012 | Dixit et al. | | 726/1 |
| 2003/0200466 A1* | 10/2003 | Nelson et al. | | 713/202 |
| 2005/0149726 A1* | 7/2005 | Joshi et al. | | 713/164 |
| 2006/0253771 A1 | 11/2006 | Baschy | | |
| 2006/0259955 A1* | 11/2006 | Gunther et al. | | 726/2 |
| 2007/0073699 A1* | 3/2007 | Reed | | 707/9 |
| 2007/0079358 A1* | 4/2007 | Lambert et al. | | 726/2 |
| 2007/0150934 A1* | 6/2007 | Fiszman et al. | | 726/1 |
| 2008/0313556 A1 | 12/2008 | Zhang et al. | | |
| 2009/0150981 A1* | 6/2009 | Amies et al. | | 726/5 |
| 2009/0327900 A1 | 12/2009 | Noll et al. | | |

\* cited by examiner

*Primary Examiner* — Phenuel Salomon
(74) *Attorney, Agent, or Firm* — Schmeiser, Olsen & Watts; Anna Linne; Matthew H. Chung

(57) ABSTRACT

A method and system for controlling access to a resource. Visual representations of the resource and an entity are included in a display. Assignments of an access control requirement to the resource visual representation and an attribute to the entity visual representation are received. A movement in the display of the entity visual representation to a position proximate to a boundary of the resource visual representation is detected. The attribute assigned to the entity visual representation is determined to satisfy the access control requirement assigned to the resource visual representation. The entity is permitted to access the resource based on the attribute satisfying the access control requirement. A movement in the display of the entity visual representation across the boundary and a placement of the entity visual representation within the boundary of the resource visual representation are permitted based on the entity being permitted to access the resource.

17 Claims, 7 Drawing Sheets

VISUALLY REPRESENTING AND MANAGING ACCESS CONTROL OF RESOURCES

TECHNICAL FIELD

The present invention relates to a data processing method and system for controlling access to information technology resources, and more particularly to a data processing technique for controlling access to resources using a visual rendering of access controls.

BACKGROUND

Known techniques for access control of information technology resources (e.g., computer files) employ traditional access control and/or mutually exclusive access control. Traditional access control ensures that an entity accessing a resource has certain attributes that match access control requirements. Mutually exclusive access control designates certain entities as incompatible so that the designated entities are not permitted to access a particular resource at the same time. The known access control techniques are based on access control lists and/or text-based rules, which are non-intuitive, error-prone, and difficult to use. Thus, there exists a need to overcome at least one of the preceding deficiencies and limitations of the related art.

BRIEF SUMMARY

Embodiments of the present invention provide a method of controlling access to IT resources. The method comprises:

a computer initiating a display including a visual representation of the resource and a visual representation of a first entity;

the computer receiving an assignment of an access control requirement to the visual representation of the resource;

the computer receiving an assignment of a first attribute to the visual representation of the first entity;

the computer detecting a movement in the display of the visual representation of the first entity from outside a boundary of the visual representation of the resource to a position substantially close to the boundary of the visual representation of the resource;

responsive to detecting the movement to the position substantially close to the boundary, the computer determining the first attribute assigned to the visual representation of the first entity satisfies the access control requirement assigned to the visual representation of the resource;

the computer determining the first entity is permitted to access the resource based on the first attribute assigned to the visual representation of the first entity satisfying the access control requirement assigned to the visual representation of the resource; and the computer permitting a movement in the display of the visual representation of the first entity across the boundary of the visual representation of the resource and permitting a placement in the display of the visual representation of the first entity within the boundary of the visual representation of the resource based on the first entity being permitted to access the resource.

A system, program product and a process for supporting computing infrastructure where the process provides at least one support service are also described herein, where the system, program product and process for supporting computing infrastructure correspond to the aforementioned method.

Embodiments of the present invention provide a graphical method for controlling access to IT resources so that the access is intuitive, easy to use and not prone to error.

DETAILED DESCRIPTION

Overview

Figure 1:
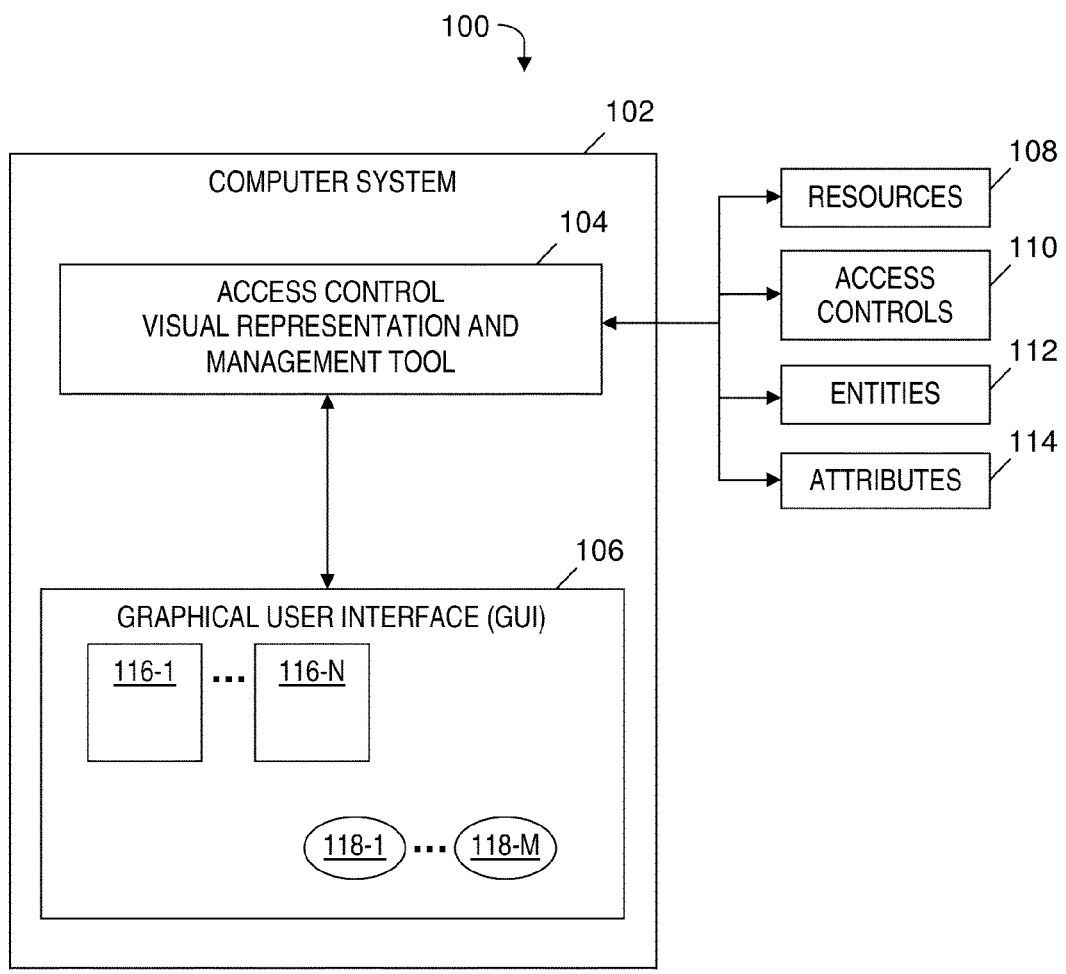
FIG. 1 is a block diagram of a system for controlling access to IT resources, in accordance with embodiments of the present invention.

Embodiments of the present invention may provide a method and system for controlling access by a user or a software application to information technology (IT) resources (e.g., computer files) by using a visual rendering of an access control abstraction that includes visual representations that relate IT resources, entities accessing the IT resources, attributes of the entities, and access control requirements associated with the IT resources. The visual rendering of the access control abstraction allows a non-technical user to easily understand and manage access control. Users may use a graphical user interface (GUI) to use GUI methods (e.g., drag and drop) to directly manipulate the visual representations of members of access control sets, thereby controlling access to IT resources.

In one embodiment, a GUI allows an administrator to create a geometric shape to visually represent any type of IT resource and define the IT resource by the particular shape and by defining attributes of the shape (e.g., color, size, type of outline, etc.). Further, the GUI allows the administrator graphically manipulate who has access to the IT resources, by individual or by group. The GUI may limit the number of entities permitted to access an IT resource based on the size of the geometric shape representing the IT resource. For example, a maximum number of entities permitted to access the IT resource is determined by the maximum number of (e.g., non-overlapping) geometric shapes representing entities that are able to fit into the IT resource's geometric shape. The GUI also allows for a definition of entities that are explicitly denied access to any or all IT resources.

Visual representation and visual control of access to IT resources as disclosed herein may be implemented in any software product that includes resource access control functionality, including security products, such as the administrative console of Security Network Intrusion Prevention System (IPS) supported by Internet Security System (ISS), and Tivoli Identity Manager (TIM). ISS, IPS and TIM are offered by International Business Machines Corporation located in Armonk, N.Y.

As used herein, an IT resource is defined as a physical item or logical item being managed in an information system of an enterprise. IT resources may include, for example, disk drives, network interfaces, application servers, processors, memory, adapters, input/output devices, database applications, processes, file systems, data sets, computer files, and control or processing programs. Hereinafter, an IT resource is referred to simply as a "resource."

As used herein an entity is defined as a person or group of persons. An entity may want or require access to a resource, and is either allowed to access the resource or is prohibited from accessing the resource.

As used herein, an attribute of an entity is defined as a characteristic or trait of an entity that describes the entity. Attributes of an entity include, for example, the entity's role in an organization, the entity's location, the entity's clearance level, etc.

System for Controlling Access to a Resource

FIG. 1 is a block diagram of a system for controlling access to IT resources, in accordance with embodiments of the present invention. System 100 includes a computer system 102, which runs a software-based access control visual representation and management tool 104. Tool 104 exchanges data with a GUI 106 for graphically representing and graphically manipulating access controls that determine what resource(s) each entity is permitted to access and what other resource(s) each entity is prohibited from accessing.

Tool 104 associates each resource of resources 108 with a corresponding visual representation, and further associates one or more access controls (a.k.a. access control requirements) of access controls 110 with each resource of resources 108. Tool 104 also associates each entity of entities 112 with a corresponding visual representation, and further associates one or more attributes of attributes 114 with each entity of entities 112.

Tool 104 initiates a display on GUI 106 that includes visual representations 116-1 . . . 116-N of N corresponding resources, where N≥1. Hereinafter, a visual representation of a resource is also referred to as a "resource visual representation." Although resource visual representations 116-1 . . . 116-N are depicted in FIG. 1 as being of the same rectangular shape, embodiments of the present invention contemplate GUI 106 displaying resource visual representations having different shapes (e.g., rectangles, parallelograms, and crosses), or that displays some resource visual representations having the same shape and others having different shapes. In one embodiment, each different shape of a resource visual representation indicates a corresponding type of resource. For example, all rectangles displayed in GUI 106 may indicate computer files, all displayed parallelograms may indicate data storage, and all displayed crosses may indicate applications.

The display on GUI 106 initiated by tool 104 includes visual representations 118-1 . . . 118-M of M corresponding entities, where M≥1. Hereinafter, a visual representation of an entity is also referred to as an "entity visual representation." Although entity visual representations 118-1 . . . 118-M are depicted in FIG. 1 as being of the same oval shape, embodiments of the present invention contemplate GUI 106 displaying entity visual representations having different shapes (e.g., ovals and hexagons), or that displays some entity visual representations having the same shape and others having different shapes. In one embodiment, each different shape of an entity visual representation indicates a corresponding type of entity. For example, each oval displayed in GUI 106 may indicate a corresponding individual person, while each hexagon may indicate a corresponding group of people.

As one example, GUI 106 may include rectangles that represent resources, ovals that represent entities that are individual consumers of resources, and hexagons that represent entities that are groups of individual consumers of resources. If an oval or hexagon is located within the boundary of a rectangle, then the entity represented by the oval or hexagon is allowed to access the resource represented by the rectangle. The resource represented by a rectangle may be a single resource (e.g., a document) or a collection of resources (e.g., multiple documents with the same attributes such as the same classification of "confidential"). The resource may also be an application (e.g., an accounts payable system). In addition, the entity and/or the resource can be distinguished by both shape and color. Furthermore, a resource may be subdivided into regions with different access control properties for each region. For instance, if a first region is enclosed with a dashed line, then access for entities whose representations are within the first region is "read only", and if a second region is enclosed with a solid line, then access for entities whose representations are within the second region is "read/write".

In addition to traditional access control concepts (i.e., assuring that an entity accessing the resource has certain attributes such as identity that match the access control requirements of the resource), embodiments of the present invention include visual representations access control requirements that address mutually exclusive access control and the concept of incompatible objects. Some entities may be mutually exclusive so that the entities are not allowed access to a particular resource at the same time. For example, Person A from company XYZ and Person B from company WXY are not permitted to access Document Q at the same time because of a legal agreement between XYZ and WXY. In this example, if a first oval representing Person A is placed in a rectangle representing Document Q, then a second oval representing Person B is not permitted to be placed in the same rectangle as long as the first oval is in the rectangle. Furthermore, some entities may be mutually required so that the entities are allowed access to a particular resource only at the same time. For example, Person A from company XYZ and Person B from company WXY may both be required to access Resource R at the same time because of a legal agreement between XYZ and WXY. In this example regarding entities that are mutually required, both a first oval representing Person A and a second oval representing Person B must be placed in the same rectangle representing Resource R prior to both Person A and Person B being granted access to Resource R. If either oval is withdrawn from the rectangle representing Resource R, then access to Resource R is terminated for the person represented by the remaining oval.

Computer system 102 may include hardware and software components, which are described below relative to FIG. 6.

The functionality of the components of system 100 is further described below relative to FIG. 2, FIGS. 3A-3B and FIG. 6.

Preparatory Process for Controlling Access to a Resource

Figure 2:
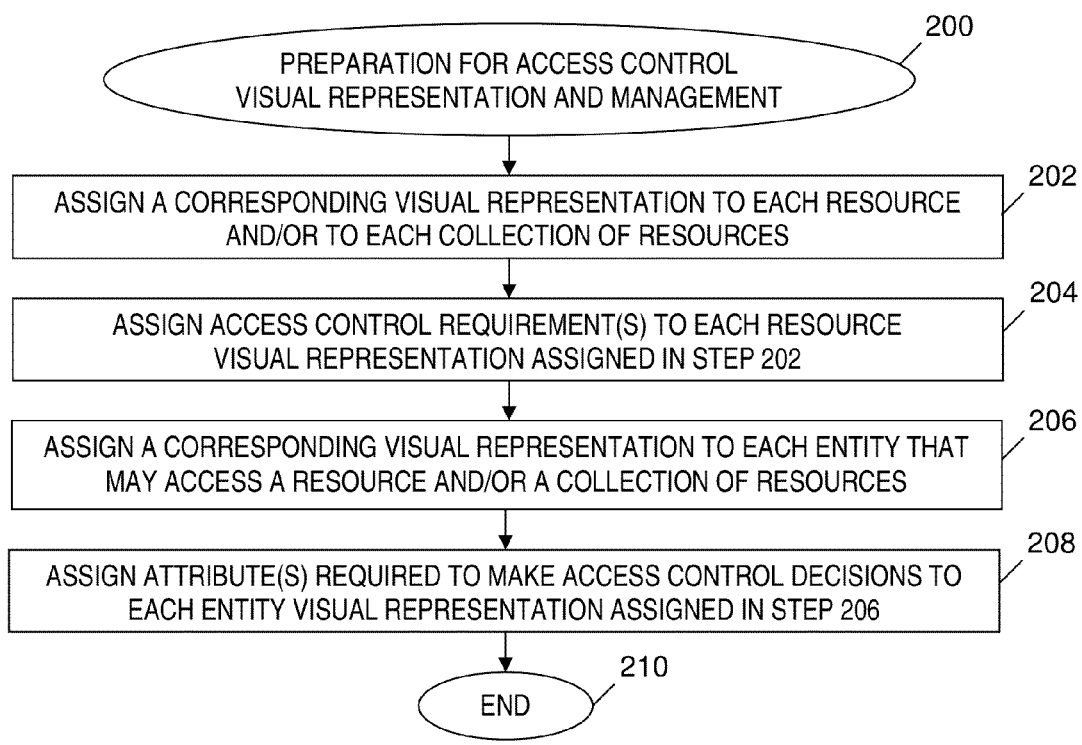
FIG. 2 is a flowchart of a preparatory process for controlling access to IT resources, where the process is implemented in the system of FIG. 1, in accordance with embodiments of the present invention.

FIG. 2 is a flowchart of a preparatory process for controlling access to IT resources, where the process is implemented in the system of FIG. 1, in accordance with embodiments of the present invention. The preparatory process for controlling access to resources starts at step 200. In step 202, computer system 102 (see FIG. 1) assigns a corresponding visual representation to each resource and/or to each collection of resources. In one embodiment, step 202 assigns each resource a specific shape and a specific color, and may also assign one or more resources with a specific size and/or a specific type of outline (e.g., solid line or dashed line). For example, step 202 assigns rectangle shapes to all resources that are computer files, where a rectangle shape may be red to indicate that the corresponding computer files have a "top secret" security classification and another rectangle shape may be blue to indicate that the corresponding computer files have a "secret" security classification.

In step 204, computer system 102 (see FIG. 1) assigns access control requirement(s) to each resource visual representation assigned in step 202. Step 204 may include an assignment of any combination of the following access control requirements for each resource visual representation:

A specific type of access may be associated with the resource visual representation. For instance, the resource may have read or read/write access by an entity.

A specific access action may be associated with the resource visual representation. For example, the resource requires a log-in by an entity.

A specific role-based access control may be associated with the resource visual representation. For instance, the resource is permitted to be accessed only by a member of the accounts payable department.

A specific exclusion access control may be associated with the resource visual representation. For example, only two entities are permitted to have access to the resource at the same instant of time or within a period of time. As another example, entities having one or more particular attributes are not permitted to access the resource.

Those skilled in the art will understand that other types of access control requirements may be added to the aforementioned list.

In step 206, computer system 102 (see FIG. 1) assigns a corresponding visual representation to each entity that may access to a resource and/or a collection of resources. In one embodiment, step 206 assigns each entity a specific shape and a specific color, and optionally may assign one or more entities with a specific size and/or a specific type of outline (e.g., solid line or dashed line). For example, step 206 assigns oval shapes to all individuals and hexagons to all groups of people.

In step 208, computer system 102 (see FIG. 1) assign attribute(s) to each entity visual representation assigned in step 206. The assigned attribute(s) are required to make access control decisions based on the access control requirements assigned in step 204. Attributes assigned to an entity in step 208 may include, for example, the role of the entity in an organization, the location of the entity, the clearance level of the entity, etc.

In one embodiment, steps 202-208 are performed by tool 104 (see FIG. 1).

In step 210, the preparatory process of controlling access to resources ends.

Operational Process for Controlling Access to a Resource

Figure 3A:
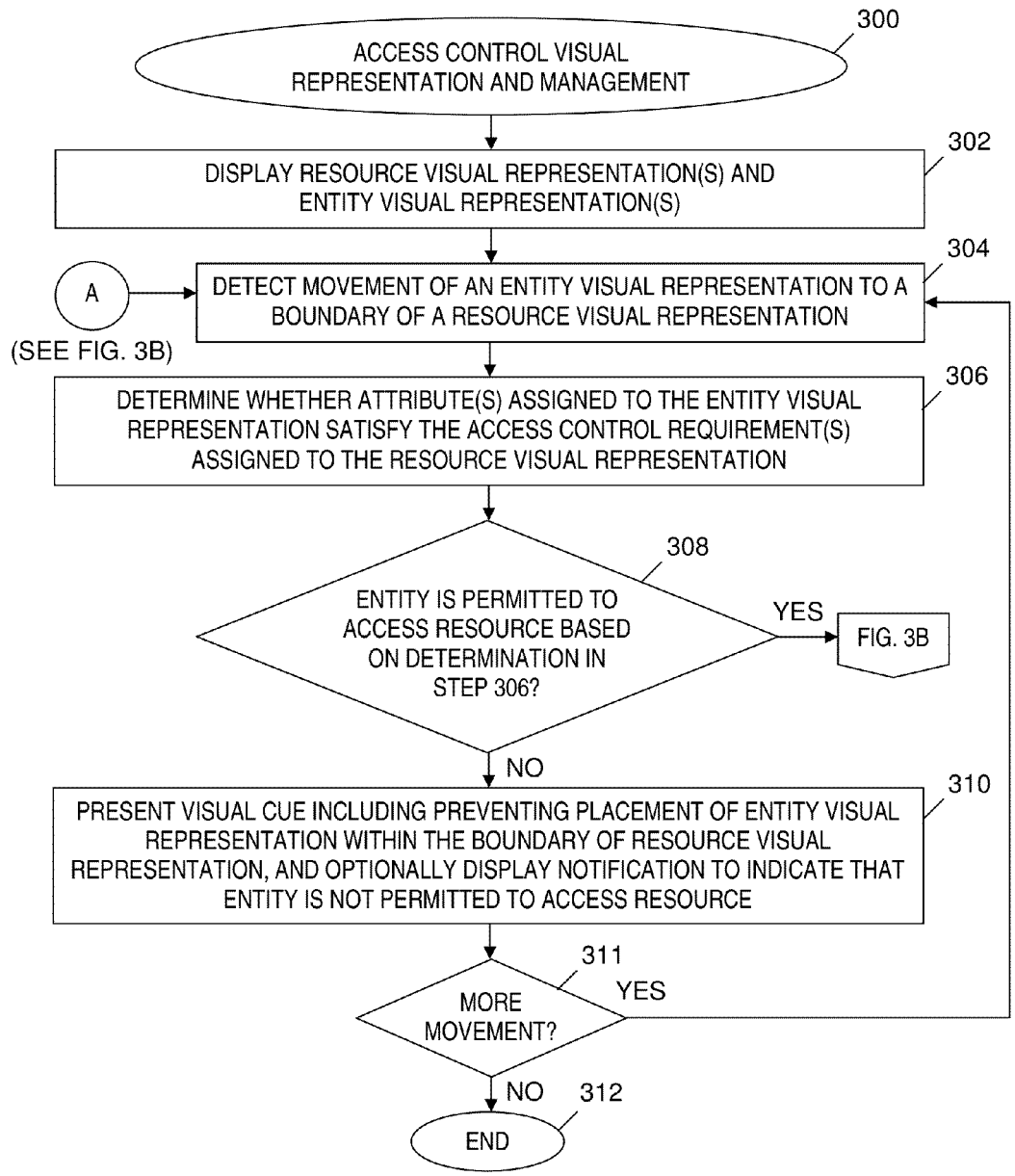
FIGS. 3A-3B depict a flowchart of an operational process for controlling access to IT resources, where the process is implemented in the system of FIG. 1, in accordance with embodiments of the present invention.
Figure 3B:
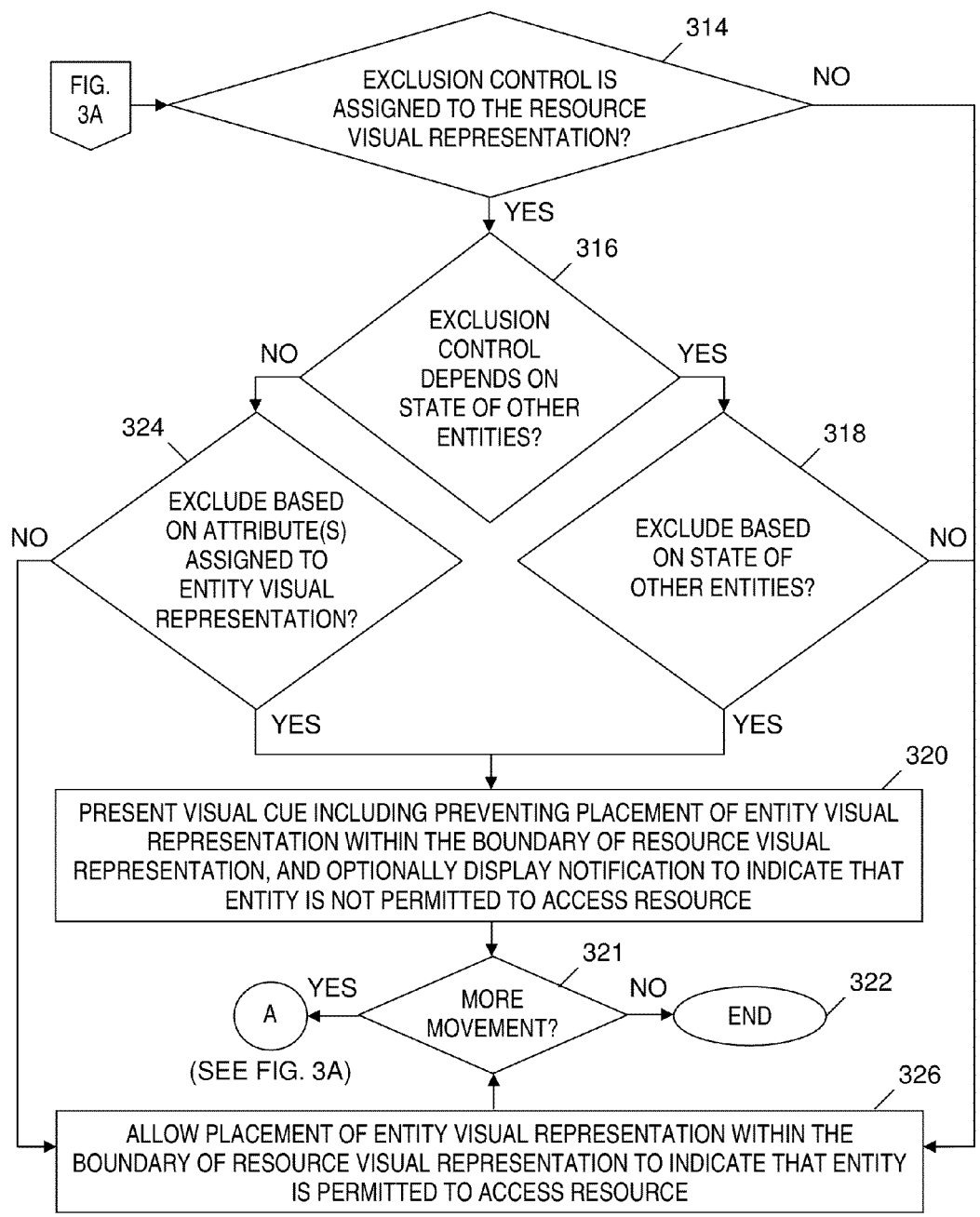

FIGS. 3A-3B depict a flowchart of an operational process for controlling access to IT resources, where the process is implemented in the system of FIG. 1, in accordance with embodiments of the present invention. The preparatory process of FIG. 2 precedes the process of FIGS. 3A-3B. The operational process for controlling access to resources starts at step 300 in FIG. 3A. In step 302, tool 104 (see FIG. 1) initiates a display in GUI 106 (see FIG. 1) of resource visual representation(s) and entity visual representation(s) which were assigned in step 202 (see FIG. 2) and step 206 (see FIG. 2), respectively. The display initiated in step 302 may be presented on a display device coupled to computer system 102 (see FIG. 1) or coupled to another computer. The display initiated in step 302 is hereinafter referred to simply as "the display."

In step 304, tool 104 (see FIG. 1) detects a movement in the display of an entity visual representation from outside the boundary of a displayed resource visual representation to a position substantially close to the boundary of the resource visual representation. The resource visual representation was assigned to a resource in step 202 (see FIG. 2). Hereinafter, in the discussion of FIGS. 3A-3B, the resource to which the resource visual representation was assigned is referred to simply as "the resource."

In step 306, tool 104 (see FIG. 1) determines whether attribute(s) assigned in step 208 (see FIG. 2) to a displayed entity visual representation satisfies the access control requirement(s) assigned in step 204 (see FIG. 2) to the resource visual representation. The entity visual representation was assigned to an entity in step 206 (see FIG. 2). Hereinafter, in the discussion of FIGS. 3A-3B, the entity to which the entity visual representation was assigned is referred to simply as "the entity."

In step 308, based on the determination in step 306, tool 104 (see FIG. 1) determines that the entity is permitted to access the resource or that the entity is not permitted to access the resource. If step 308 determines that the entity is not permitted to access the resource, then the No branch of step 308 is taken and step 310 is performed.

In step 310, tool 104 (see FIG. 1) initiates a presentation of a visual cue on the display and optionally initiates a presentation of a notification, where the visual cue and the notification indicate to a user that the entity is not permitted to access the resource. The initiation of the visual cue includes preventing a placement of the entity visual representation within the boundary of the resource visual representation. In one embodiment, preventing the placement of the entity visual representation within the boundary of the resource visual representation includes preventing a movement of the entity visual representation across the boundary of the resource visual representation.

In step 311, if tool 104 (see FIG. 1) determines there is more movement of an entity visual representation on the display, then the Yes branch of step 311 is taken and the process of FIGS. 3A-3B loops back to step 304. If step 311 determines that there is no further movement of any entity visual representations on the display, then the process of FIGS. 3A-3B ends at step 312.

Returning to step 308, if tool 104 (see FIG. 1) determines that the entity is permitted to access the resource based on the determination made in step 306, then the Yes branch of step 308 is taken and step 314 in FIG. 3B is performed.

In step 314 in FIG. 3B, tool 104 (see FIG. 1) determines whether an exclusion access control requirement was assigned to the resource visual representation in step 204 (see FIG. 2). An exclusion access control requirement indicates attribute(s) that cause an entity to be not permitted to access a resource (i.e., the entity is excluded from accessing the resource). If step 314 determines that an exclusion access control requirement is assigned to the resource visual representation, then the Yes branch of step 314 is taken and step 316 is performed.

In step 316, if tool 104 (see FIG. 1) determines that the exclusion access control requirement depends on the state of other entities, then the Yes branch of step 316 is taken and step 318 is performed.

In step 318, if tool 104 (see FIG. 1) determines that the exclusion access control requirement is satisfied by the state of the other entities, then the Yes branch of step 318 is taken and step 320 is performed.

In step 320, tool 104 (see FIG. 1) initiates a presentation of a visual cue on the display and optionally initiates a presentation of a notification, where the visual cue and the notification indicate to a user that the entity is not permitted to access the resource. The initiation of the visual cue includes preventing a placement of the entity visual representation within the boundary of the resource visual representation. In one embodiment, preventing the placement of the entity visual representation within the boundary of the resource visual representation includes preventing a movement of the entity visual representation across the boundary of the resource visual representation.

As an example of taking the Yes branch of step 318, consider an exclusion access control requirement that specifies a maximum of N entities are permitted to have access to the resource at one time, where N≥1. The resource visual representation is assigned an area (hereinafter, "assigned area") within its boundary into which a maximum of N visual representations of N entities are able to fit (see step 202 in FIG. 2). Tool 104 (see FIG. 1) detects N placements of N entity visual representations within the assigned area within the boundary of the resource visual representation. In this example, the state of the other entities relative to step 318 is the number of entity visual representations that are already in the assigned area within the boundary. Furthermore, since there are already N entity visual representations in the assigned area, the movement detected in step 304 (see FIG. 3A) is determined in step 318 to be the movement of an (N+1)-th entity visual representation to a position substantially close to the boundary. Tool 104 (see FIG. 1) determines that the (N+1)-th entity visual representation does not fit into the assigned area within the boundary. Based on the (N+1)-th entity visual representation not fitting into the assigned area, the Yes branch of step 318 is taken and tool 104 (see FIG. 1) further determines that the (N+1)-th entity is not permitted to access the resource. Based on the determination that the (N+1)-th entity is not permitted to access the resource, tool 104 (see FIG. 1) prevents a placement in the display of the (N+1)-th entity visual representation within the assigned area (see step 320).

In step 321, if tool 104 (see FIG. 1) determines there is more movement of an entity visual representation on the display, then the Yes branch of step 321 is taken and the process of FIGS. 3A-3B loops back to step 304 (see FIG. 3A). If step 321 determines that there is no further movement of any entity visual representations on the display, then the process of FIGS. 3A-3B ends at step 322.

Returning to step 316, if tool 104 (see FIG. 1) determines that the exclusion access control requirement does not depend on the state of other entities, then the No branch of step 316 is taken and step 324 is performed.

In step 324, if tool 104 (see FIG. 1) determines that the exclusion access control requirement is satisfied by attribute(s) assigned to the entity visual representation, then the Yes branch of step 324 is taken and steps 320 and 322 are performed as described above.

In step 324, if tool 104 (see FIG. 1) determines that the exclusion access control requirement is not satisfied by attribute(s) assigned to the entity visual representation, then the No branch of step 324 is taken and step 326 is performed.

In step 326, tool 104 (see FIG. 1) allows a movement in the display of the entity visual representation across the boundary of the resource visual representation and a placement in the display of the entity visual representation within the boundary of the resource visual representation to indicate that the entity is permitted to access the resource. After step 326, step 321 is performed, as described above.

Returning to step 318, if tool 104 (see FIG. 1) determines that the exclusion access control requirement is not satisfied by the state of the other entities, then the No branch of step 318 is taken and step 326 followed by step 321 are performed, as described above.

Returning to step 314, if tool 104 (see FIG. 1) determines that an exclusion access control requirement is not assigned to the resource visual representation, then the No branch of step 314 is taken and step 326 followed by step 321 are performed, as described above.

EXAMPLES

Figure 4:
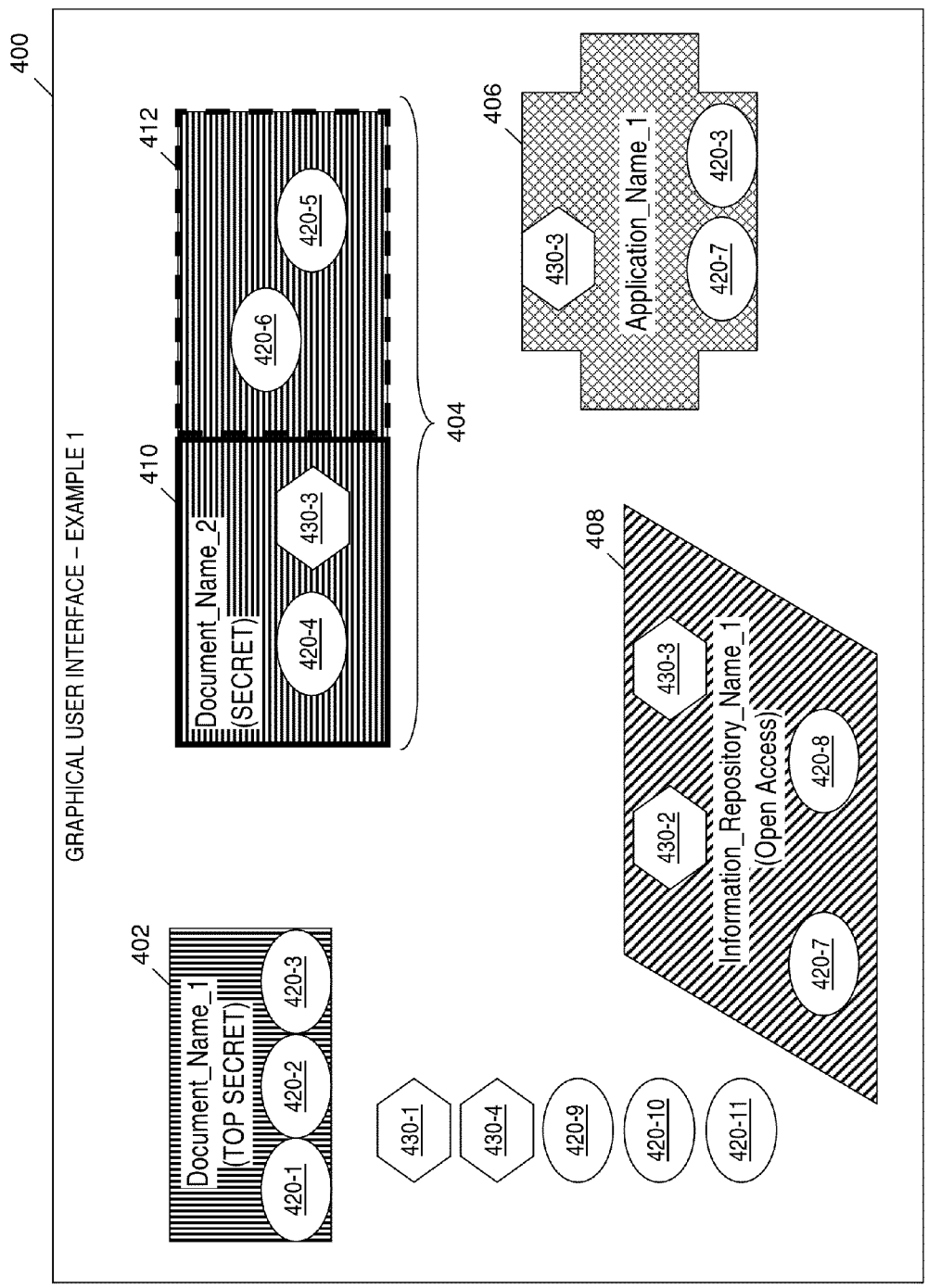
FIG. 4 is a first exemplary graphical user interface included in the system of FIG. 1, in accordance with embodiments of the present invention.

FIG. 4 is a first exemplary graphical user interface included in the system of FIG. 1, in accordance with embodiments of the present invention. GUI 106 (see FIG. 1) may be, for example, GUI 400, which includes resource visual representations 402, 404, 406 and 408. Each of the resource visual representations included in GUI 400 has a color associated with it, which is illustrated by a fill pattern that fills the interior of each visual representation. The fill pattern comprising vertical lines in resource visual representation 402 indicates that its color is red. The fill pattern comprising horizontal lines in resource visual representation 404 indicates that its color is blue. The cross-hatch fill pattern of resource visual representation 406 indicates that its color is orange. The fill pattern comprising diagonal lines in resource visual representation 408 indicates its color is green. Although FIG. 4 does not show a fill pattern behind the labels for reasons of readability, the color of each resource visual representation is also behind each label of the visual representation. For example, the red color of rectangle 402 is where the vertical line fill pattern is and is also the color of the space that includes the label "Document_Name_1 (TOP SECRET)."

Resource visual representation 402 is a rectangle to indicate that the resource being represented is a single document. In this case, rectangle 402 represents a document identified as Document_Name_1, which is the label on the rectangle. The color of rectangle 402 indicates meta data of the document, which in this example is the security classification of the document. Rectangle 402 is red to indicate that Document_Name_1 is a document that has a "TOP SECRET" security classification. Because Document_Name_1 has a TOP SECRET classification, access to the document is limited to a maximum of three people. The access to Document_Name_1 being limited to three people is represented by the size of rectangle 402, which is filled up by three non-overlapping ovals that represent people.

Like resource visual representation 402, resource visual representation 404 is also a rectangle to indicate that the resource being represented is a single document. In this case, rectangle 404 represents a document identified as Document_Name_2, which is the label on rectangle 404. The color of rectangle 404 indicates meta data of the document being represented, which in this example is the security classification of the document. Rectangle 404 is blue to indicate that Document_Name_2 is a document that has a "SECRET" security classification. The line type of the outline of regions of rectangle 404 also indicates meta data of the document. In this case, a solid line as the outline of region 410 indicates read/modify access to Document_Name_2 and a dashed line as the outline of region 412 indicates read only access to Document_Name_2.

Resource visual representation 406 is a cross shape to indicate that the resource being represented is an application. In this case, cross 406 represents an application identified as Application_Name_1, which is the label on cross 406. The color of cross 406 indicates meta data of the application being represented, which in this example is the access role category associated with the application. Cross 406 is orange to indicate that only entities whose role is Role X are permitted access to Application_Name_1.

Resource visual representation 408 is a parallelogram shape to indicate that the resource being represented is an information repository containing multiple documents. In this case, parallelogram 408 represents an information repository identified as Information_Repository_Name_1, which is the label on parallelogram 408. The color of parallelogram 408 indicates meta data of the information repository being represented, which in this example is the security classification of the information repository. Parallelogram 408 is green to indicate that Information_Repository_Name_1 has an "OPEN ACCESS" security classification.

GUI also includes entity visual representations 420-1, 420-2, 420-3, 420-4, 420-5, 420-6, 420-7, 420-8, 420-9, 420-10 and 420-11, which are oval shapes. Ovals 420-1 through 420-11 represent Person 1 through Person 11, respectively. Person 1 through Person 11 identifies 11 individual persons. Further, GUI includes entity visual representations 430-1, 430-2, 430-3 and 430-4, which are hexagon shapes. Hexagons 430-1 through 430-4 represent Group 1 through Group 4, respectively. Groups 1 through 4 identify four groups of people.

Ovals 420-1, 420-2 and 420-3 are placed in rectangle 402, which graphically indicates that Persons 1, 2 and 3 are permitted to access Document_Name_1.

Oval 420-4 and hexagon 430-3 are placed in region 410, which graphically indicates that Person 4 and persons in Group 3 are permitted read/modify access to Document_Name_2.

Ovals 420-5 and 420-6 are placed in region 412, which graphically indicates that Person 5 and Person 6 are permitted read only access to Document_Name_2.

Ovals 420-3 and 420-7 and hexagon 430-3 are placed in cross 406, which graphically indicates that Person 3, Person 7 and persons in Group 3 are permitted to access Application_Name_1.

Ovals 420-7 and 420-8 and hexagons 430-2 and 430-3 are placed in parallelogram 408, which graphically indicates that Person 7, Person 8, persons in Group 2, and persons in Group 3 are permitted open access to the documents in Information_Repository_Name_1.

Ovals 420-9, 420-10 and 420-11, and hexagons 430-1 and 430-4 are not placed in any resource visual representation included in GUI 400, which graphically indicates that Person 9, Person 10, Person 11, Group 1 and Group 4 have not been assigned access to the documents, information repository and application represented in GUI 400.

Figure 5:
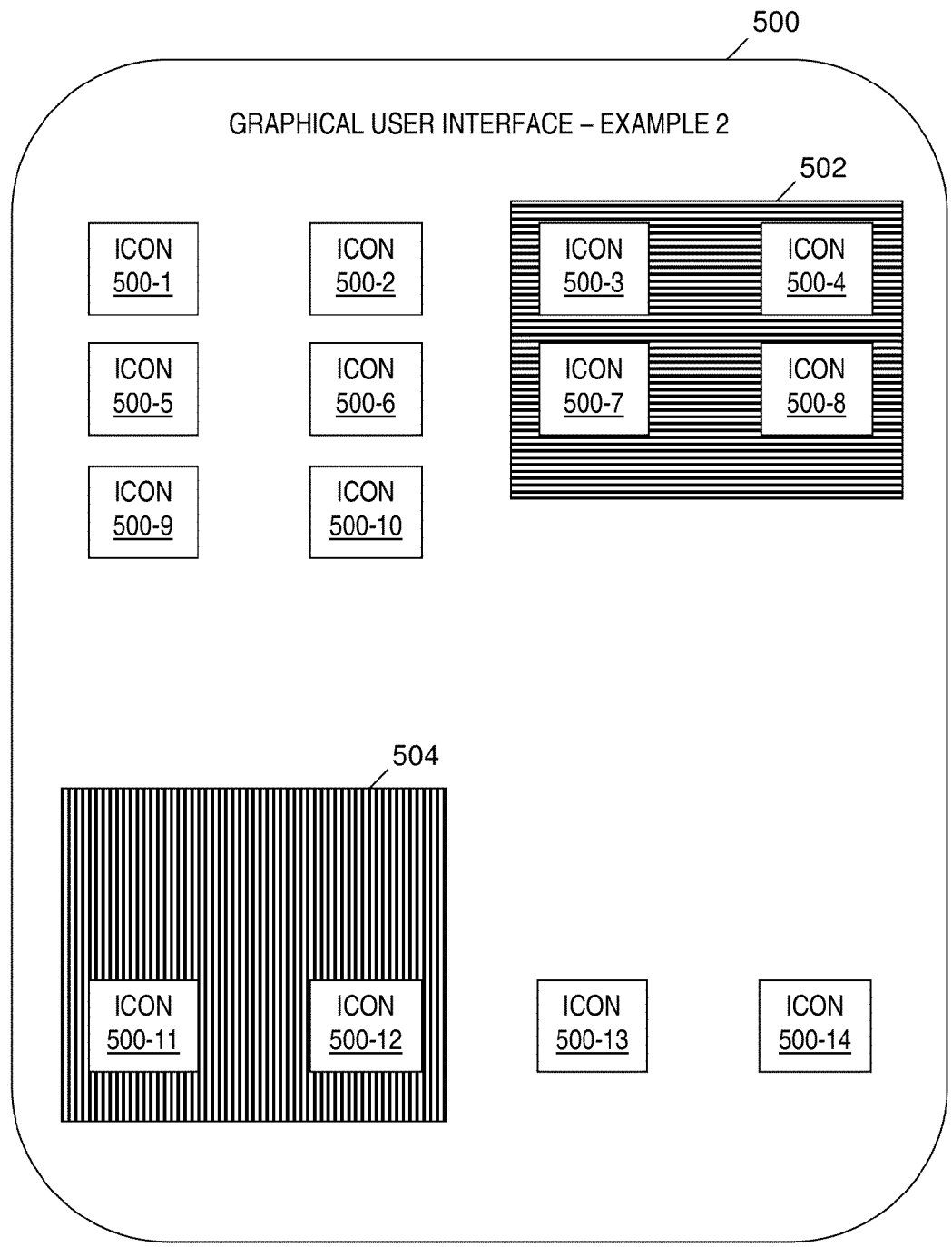
FIG. 5 is a second exemplary graphical user interface included in the system of FIG. 1, in accordance with embodiments of the present invention.

In another embodiment, access control to end point resources by applications (a.k.a. apps) residing on a computing device (e.g., smartphone or tablet computer) is visually rendered to enable the operator of the computing device to graphically control access the computing device's resources. For example, the visual rendering of the access control on a tablet computer is depicted in GUI 500 in FIG. 5.

GUI 500 includes application icons 500-1, 500-2, 500-3, 500-4, 500-5, 500-6, 500-7, 500-8, 500-9, 500-10, 500-11, 500-12, 500-13 and 500-14, which represent Applications 1 through 14, respectively. GUI 500 also includes resource visual representations 502 and 504. Resource visual representations 502 and 504 represent the computing device's storage. Each of the resource visual representations included in GUI 500 has a color associated with it, which is illustrated by a fill pattern that fills the interior of each resource visual representation. The fill pattern comprising horizontal lines in resource visual representation 502 indicates that its color is blue. The fill pattern comprising horizontal lines in resource visual representation 504 indicates that its color is red.

The user of GUI 500 utilizes visually-guided placement to place application icons in particular areas of GUI 500, thereby determining the access rights of the applications to the computing device's resources. In this example, applications whose icons are in a blue rectangle are permitted to read any part of the computing device's storage. Applications whose icons are in a red rectangle are permitted to read only the "public" storage of the computing device. Furthermore, applications whose icons are not in any rectangle are permitted to read and write to any part of the computing device's storage.

Therefore, application icons 500-3, 500-4, 500-7 and 500-8 are in the blue rectangle 502, which graphically indicates that Applications 3, 4 7 and 8 are permitted to read any part of the computing device's storage. Further, application icons 500-11 and 500-12 are in the red rectangle 504, which graphically indicates that Applications 11 and 12 are permitted to read only the "public" storage of the computing device. Still further, application icons 500-1, 500-2, 500-5, 500-6, 500-9, 500-10, 500-13 and 500-14 are not in rectangle 502 or rectangle 504, which graphically indicates that Applications 1, 2, 5, 6, 9, 10, 13 and 14 are permitted to read and write to any part of the computing device's storage.

Computer System

Figure 6:
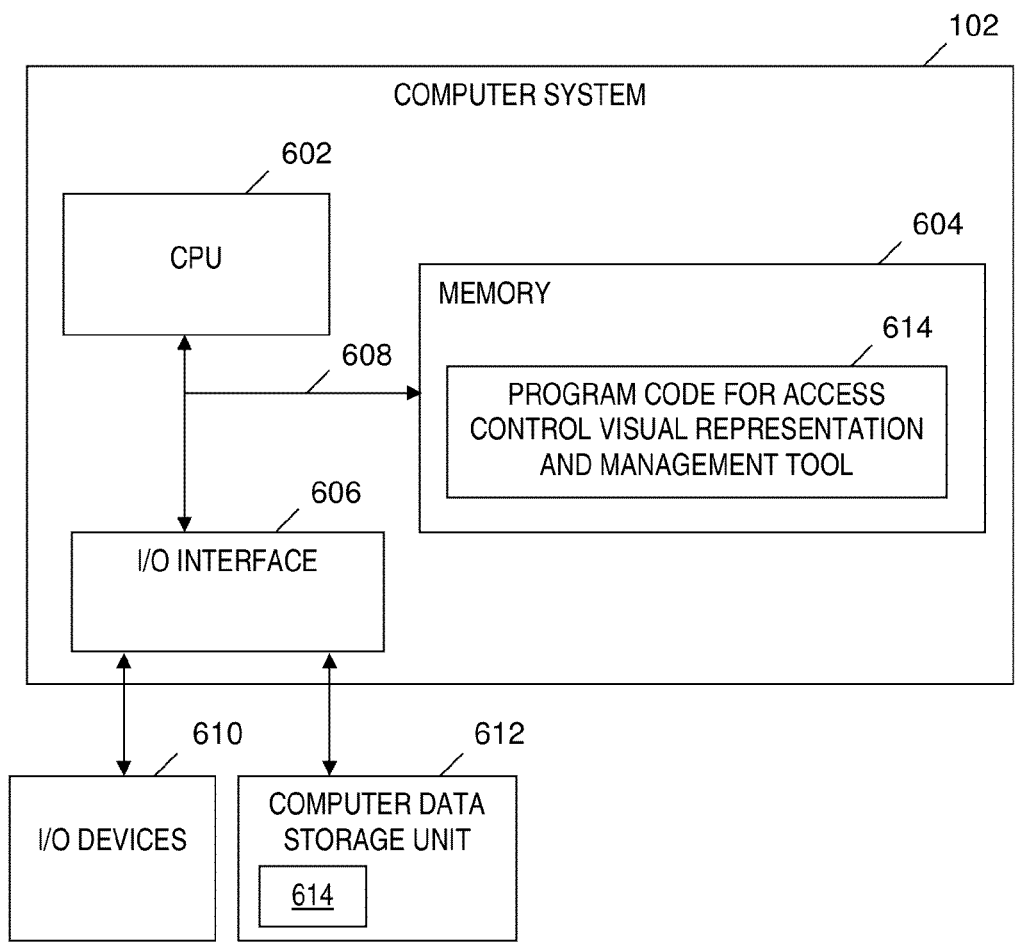
FIG. 6 is a block diagram of a computer system that is included in the system of FIG. 1 and that implements the processes of FIG. 2 and FIGS. 3A-3B, in accordance with embodiments of the present invention.

FIG. 6 is a block diagram of a computer system that is included in the system of FIG. 1 and that implements the processes of FIG. 2 and FIGS. 3A-3B, in accordance with embodiments of the present invention. Computer system 102 generally comprises a central processing unit (CPU) 602, a memory 604, an input/output (I/O) interface 606, and a bus 608. Further, computer system 102 is coupled to I/O devices 610 and a computer data storage unit 612. CPU 602 performs computation and control functions of computer system 102, including carrying out instructions included in program code 614 to perform a method of controlling access to resources, where the instructions are carried out by CPU 602 via memory 604. CPU 602 may comprise a single processing unit, or be distributed across one or more processing units in one or more locations (e.g., on a client and server).

Memory 604 may comprise any known computer-readable storage medium, which is described below. In one embodiment, cache memory elements of memory 604 provide temporary storage of at least some program code (e.g., program code 614) in order to reduce the number of times code must be retrieved from bulk storage while instructions of the program code are carried out. Moreover, similar to CPU 602, memory 604 may reside at a single physical location, comprising one or more types of data storage, or be distributed across a plurality of physical systems in various forms. Further, memory 604 can include data distributed across, for example, a local area network (LAN) or a wide area network (WAN).

I/O interface 606 comprises any system for exchanging information to or from an external source. I/O devices 610 comprise any known type of external device, including a display device (e.g., monitor), keyboard, mouse, printer, speakers, handheld device, facsimile, etc. Bus 608 provides a communication link between each of the components in computer system 102, and may comprise any type of transmission link, including electrical, optical, wireless, etc.

I/O interface 606 also allows computer system 102 to store information (e.g., data or program instructions such as program code 614) on and retrieve the information from computer data storage unit 612 or another computer data storage unit (not shown). Computer data storage unit 612 may comprise any known computer-readable storage medium, which is described below. For example, computer data storage unit 612 may be a non-volatile data storage device, such as a magnetic disk drive (i.e., hard disk drive) or an optical disc drive (e.g., a CD-ROM drive which receives a CD-ROM disk).

Memory 604 and/or storage unit 612 may store computer program code 614 that includes instructions that are carried out by CPU 602 via memory 604 to control access to resources. Although FIG. 6 depicts memory 604 as including program code 614, the present invention contemplates embodiments in which memory 604 does not include all of code 614 simultaneously, but instead at one time includes only a portion of code 614.

Further, memory 604 may include other systems not shown in FIG. 6, such as an operating system (e.g., Linux) that runs on CPU 602 and provides control of various components within and/or connected to computer system 102.

Storage unit 612 and/or one or more other computer data storage units (not shown) that are coupled to computer system 102 may store resources 108 (see FIG. 1), access controls 110 (see FIG. 1), entities 112 (see FIG. 1) and/or attributes 114 (see FIG. 1).

As will be appreciated by one skilled in the art, the present invention may be embodied as a system, method or computer program product. Accordingly, an aspect of an embodiment of the present invention may take the form of an entirely hardware aspect, an entirely software aspect (including firmware, resident software, micro-code, etc.) or an aspect combining software and hardware aspects that may all generally be referred to herein as a "module".

Furthermore, an embodiment of the present invention may take the form of a computer program product embodied in one or more computer-readable medium(s) (e.g., memory 604 and/or computer data storage unit 612) having computer-readable program code (e.g., program code 614) embodied or stored thereon.

Any combination of one or more computer-readable mediums (e.g., memory 604 and computer data storage unit 612) may be utilized. The computer-readable medium may be a computer-readable signal medium or a computer-readable storage medium. In one embodiment the computer-readable storage medium is a computer-readable storage device or computer-readable storage apparatus. A computer-readable storage medium may be, for example, but not limited to, an electronic, magnetic, optical, electromagnetic, infrared or semiconductor system, apparatus, device or any suitable combination of the foregoing. A non-exhaustive list of more specific examples of the computer-readable storage medium includes: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be a tangible medium that can contain or store a program (e.g., program 614) for use by or in connection with a system, apparatus, or device for carrying out instructions.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with a system, apparatus, or device for carrying out instructions.

Program code (e.g., program code 614) embodied on a computer-readable medium may be transmitted using any appropriate medium, including but not limited to wireless, wireline, optical fiber cable, RF, etc., or any suitable combination of the foregoing.

Computer program code (e.g., program code 614) for carrying out operations for aspects of the present invention may be written in any combination of one or more programming languages, including an object oriented programming language such as Java®, Smalltalk, C++ or the like and conventional procedural programming languages, such as the "C" programming language or similar programming languages. Instructions of the program code may be carried out entirely on a user's computer, partly on the user's computer, as a stand-alone software package, partly on the user's computer and partly on a remote computer or entirely on the remote computer or server, where the aforementioned user's computer, remote computer and server may be, for example, computer system 102 or another computer system (not shown) having components analogous to the components of computer system 102 included in FIG. 6. In the latter scenario, the remote computer may be connected to the user's computer through any type of network (not shown), including a LAN or a WAN, or the connection may be made to an external computer (e.g., through the Internet using an Internet Service Provider).

Aspects of the present invention are described herein with reference to flowchart illustrations (e.g., FIG. 2 and FIGS. 3A-3B) and/or block diagrams of methods, apparatus (systems) (e.g., FIG. 1 and FIG. 6), and computer program products according to embodiments of the invention. It will be understood that each block of the flowchart illustrations and/or block diagrams, and combinations of blocks in the flowchart illustrations and/or block diagrams, can be implemented by computer program instructions (e.g., program code 614). These computer program instructions may be provided to one or more hardware processors (e.g., CPU 602) of a general purpose computer, special purpose computer, or other programmable data processing apparatus to produce a machine, such that the instructions, which are carried out via the processor(s) of the computer or other programmable data processing apparatus, create means for implementing the functions/acts specified in the flowchart and/or block diagram block or blocks.

These computer program instructions may also be stored in a computer-readable medium (e.g., memory 604 or computer data storage unit 612) that can direct a computer (e.g., computer system 102), other programmable data processing apparatus, or other devices to function in a particular manner, such that the instructions (e.g., program 614) stored in the computer-readable medium produce an article of manufacture including instructions which implement the function/act specified in the flowchart and/or block diagram block or blocks.

The computer program instructions may also be loaded onto a computer (e.g., computer system 102), other programmable data processing apparatus, or other devices to cause a series of operational steps to be performed on the computer, other programmable apparatus, or other devices to produce a computer implemented process such that the instructions (e.g., program 614) which are carried out on the computer, other programmable apparatus, or other devices provide processes for implementing the functions/acts specified in the flowchart and/or block diagram block or blocks.

Any of the components of an embodiment of the present invention can be deployed, managed, serviced, etc. by a service provider that offers to deploy or integrate computing infrastructure with respect to controlling access to resources. Thus, an embodiment of the present invention discloses a process for supporting computer infrastructure, wherein the process comprises providing at least one support service for at least one of integrating, hosting, maintaining and deploying computer-readable code (e.g., program code 614) in a computer system (e.g., computer system 102) comprising one or more processors (e.g., CPU 602), wherein the processor(s) carry out instructions contained in the code causing the computer system to control access to resources.

In another embodiment, the invention provides a method that performs the process steps of the invention on a subscription, advertising and/or fee basis. That is, a service provider, such as a Solution Integrator, can offer to create, maintain, support, etc. a process of controlling access to resources. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flowcharts in FIG. 2 and FIGS. 3A-3B and the block diagrams in FIG. 1 and FIG. 6 illustrate the architecture, functionality, and operation of possible implementations of systems, methods, and computer program products according to various embodiments of the present invention. In this regard, each block in the flowchart or block diagrams may represent a module, segment, or portion of code (e.g., program code 614), which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. In another embodiment, the geometric shapes described above may be associated with labels (e.g., text labels), so that the labels distinguish between resources and/or between entities. It will be apparent to those skilled in the art how FIG. 1, FIG. 2 and FIGS. 3A-3B and the related descriptions are modified to accommodate labels associated with the geometric shapes, where the labels distinguish between resources and/or between entities. As one example, all different computer resources are represented by a common geometric appearance, where the only distinguishing attribute of the representation of each computer resource is a label. As another example, a first rectangle may be labeled with "DISK1" and a second rectangle, which is the same shape as the first rectangle, may be labeled with "MEMORY" so that identical shapes with different labels distinguish between two different resources (i.e., DISK1 and MEMORY). Accordingly, the appended claims are intended to encompass all such modifications and changes as fall within the true spirit and scope of this invention.

What is claimed is:

1. A method of controlling access to an information technology (IT) resource, said method comprising:
   a computer initiating a display including a visual representation of said resource and a visual representation of a first entity;
   said computer receiving an assignment of an access control requirement to said visual representation of said resource;
   said computer receiving an assignment of a first attribute to said visual representation of said first entity;
   said computer detecting a movement in said display of said visual representation of said first entity from outside a boundary of said visual representation of said resource to a position close to said boundary of said visual representation of said resource;
   responsive to said detecting said movement to said position close to said boundary, said computer determining said first attribute assigned to said visual representation of said first entity satisfies said access control requirement assigned to said visual representation of said resource;
   said computer determining said first entity is permitted to access said resource based on said first attribute assigned to said visual representation of said first entity satisfying said access control requirement assigned to said visual representation of said resource;
   said computer permitting a movement in said display of said visual representation of said first entity across said boundary of said visual representation of said resource and permitting a placement in said display of said visual representation of said first entity within said boundary of said visual representation of said resource based on said first entity determined to be permitted to access said resource;
   said computer initiating said display further including a visual representation of a second entity;
   said computer receiving an assignment of an exclusion control requirement to said visual representation of said resource;
   said computer receiving an assignment of a second attribute to a visual representation of a second entity;
   said computer detecting a second movement in said display of said visual representation of said second entity from outside said boundary of said visual representation of said resource to said position close to said boundary of said visual representation of said resource;
   responsive to said detecting said second movement to said position close to said boundary, said computer determining said exclusion control requirement indicates exclusion based on said second attribute or based on a state of one or more other entities associated with said exclusion control requirement;
   said computer determining said second entity is not permitted to access said resource based on said exclusion control requirement indicating exclusion; and
   said computer presenting a visual cue in said display and optionally presenting a notification based on said second entity determined to be not permitted to access said resource, wherein said visual cue and said notification indicate to a user that said second entity is not permitted to access said resource.

2. The method of claim 1, further comprising:
said computer initiating said display further including a visual representation of a second entity;
said computer receiving an assignment of a second attribute to a visual representation of a second entity;
said computer detecting a second movement in said display of said visual representation of said second entity from outside said boundary of said visual representation of said resource to said position close to said boundary of said visual representation of said resource;
responsive to said detecting said second movement to said position close to said boundary, said computer determining said second attribute assigned to said visual representation of said second entity does not satisfy said access control requirement assigned to said visual representation of said resource;
said computer determining said second entity is not permitted to access said resource based on said second attribute assigned to said visual representation of said second entity not satisfying said access control requirement assigned to said visual representation of said resource; and
said computer presenting a visual cue in said display and optionally presenting a notification based on said second entity determined to be not permitted to access said resource, wherein said visual cue and said notification indicate to a user that said second entity is not permitted to access said resource.

3. The method of claim 2, wherein said presenting said visual cue includes preventing a placement in said display of said visual representation of said second entity within said boundary of said visual representation of said resource.

4. The method of claim 1, further comprising:
said computer initiating said display further including a visual representation of a second entity;
said computer receiving an assignment of an exclusion control requirement to said visual representation of said resource;
said computer receiving an assignment of a second attribute to a visual representation of a second entity;
said computer detecting a second movement in said display of said visual representation of said second entity from outside said boundary of said visual representation of said resource to said position close to said boundary of said visual representation of said resource;
responsive to said detecting said second movement to said position close to said boundary, said computer determining said exclusion control requirement does not indicate exclusion based on said second attribute or based on a state of one or more other entities associated with said exclusion control requirement;
said computer determining said second entity is permitted to access said resource based on said exclusion control requirement not indicating exclusion; and
said computer permitting a movement in said display of said visual representation of said second entity across said boundary of said visual representation of said resource and permitting a placement in said display of said visual representation of said second entity within said boundary of said visual representation of said resource based on said second entity determined to be permitted to access said resource.

5. The method of claim 1, further comprising:
said computer initiating said display further including a visual representation of a second resource;
said computer receiving an assignment of a second access control requirement to said visual representation of said second resource,
said computer rendering said visual representation of said resource as a first geometric shape having a first color;
said computer rendering said visual representation of said second resource as a second geometric shape having a second color,
wherein said first geometric shape and said second geometric shape are of a same type of shape if said resource and said second resource are of a same type of resource,
wherein said first geometric shape and said second geometric shape are of different types of shapes if said resource and said second resource are of different types of resources,
wherein said first color indicates said access control requirement, and
wherein said second color indicates said second access control requirement.

6. The method of claim 1, further comprising:
said computer rendering said visual representation of said resource as a first geometric shape having an area within said boundary into which a maximum of N visual representations of N entities fit, wherein N is greater than or equal to 1;
said computer detecting N placements of said maximum of said N visual representations of said N entities within said area of said first geometric shape;
said computer detecting a movement in said display of an (N+1)-th visual representation of an (N+1)-th entity to said position close to said boundary;
said computer determining said (N+1)-th visual representation of said (N+1)-th entity does not fit into said area that includes said maximum of said N visual representations of said N entities;
said computer determining said (N+1)-th entity is not permitted to access said resource based on said (N+1)-th entity not fitting into said area that includes said maximum of said N visual representations of said N entities; and
said computer preventing a placement in said display of said (N+1)-th visual representation of said (N+1)-th entity within said area based on said (N+1)-th entity determined to be not permitted to access said resource.

7. A computer program product, comprising a computer-readable, storage device having a computer-readable program code stored therein, said computer-readable program code containing instructions that are carried out by a central processing unit (CPU) of a computer system to implement a method of controlling access to an information technology (IT) resource, said method comprising:
initiating a display including a visual representation of said resource and a visual representation of a first entity;
receiving an assignment of an access control requirement to said visual representation of said resource;
receiving an assignment of a first attribute to said visual representation of said first entity;
detecting a movement in said display of said visual representation of said first entity from outside a boundary of said visual representation of said resource to a position close to said boundary of said visual representation of said resource;
responsive to said detecting said movement to said position close to said boundary, determining said first attribute assigned to said visual representation of said first entity satisfies said access control requirement assigned to said visual representation of said resource;

determining said first entity is permitted to access said resource based on said first attribute assigned to said visual representation of said first entity satisfying said access control requirement assigned to said visual representation of said resource;

permitting a movement in said display of said visual representation of said first entity across said boundary of said visual representation of said resource and permitting a placement in said display of said visual representation of said first entity within said boundary of said visual representation of said resource based on said first entity determined to be permitted to access said resource;

initiating said display further including a visual representation of a second entity;

receiving an assignment of an exclusion control requirement to said visual representation of said resource;

receiving an assignment of a second attribute to a visual representation of a second entity;

detecting a second movement in said display of said visual representation of said second entity from outside said boundary of said visual representation of said resource to said position close to said boundary of said visual representation of said resource;

responsive to said detecting said second movement to said position close to said boundary, determining said exclusion control requirement indicates exclusion based on said second attribute or based on a state of one or more other entities associated with said exclusion control requirement;

determining said second entity is not permitted to access said resource based on said exclusion control requirement indicating exclusion; and presenting a visual cue in said display and optionally presenting a notification based on said second entity determined to be not permitted to access said resource, wherein said visual cue and said notification indicate to a user that said second entity is not permitted to access said resource.

8. The program product of claim 7, wherein said method further comprises:

initiating said display further including a visual representation of a second entity;

receiving an assignment of a second attribute to a visual representation of a second entity;

detecting a second movement in said display of said visual representation of said second entity from outside said boundary of said visual representation of said resource to said position close to said boundary of said visual representation of said resource;

responsive to said detecting said second movement to said position close to said boundary, determining said second attribute assigned to said visual representation of said second entity does not satisfy said access control requirement assigned to said visual representation of said resource;

determining said second entity is not permitted to access said resource based on said second attribute assigned to said visual representation of said second entity not satisfying said access control requirement assigned to said visual representation of said resource; and presenting a visual cue in said display and optionally presenting a notification based on said second entity determined to be not permitted to access said resource, wherein said visual cue and said notification indicate to a user that said second entity is not permitted to access said resource.

9. The program product of claim 8, wherein said presenting said visual cue includes preventing a placement in said display of said visual representation of said second entity within said boundary of said visual representation of said resource.

10. The program product of claim 7, wherein said method further comprises:

initiating said display further including a visual representation of a second entity;

receiving an assignment of an exclusion control requirement to said visual representation of said resource;

receiving an assignment of a second attribute to a visual representation of a second entity;

detecting a second movement in said display of said visual representation of said second entity from outside said boundary of said visual representation of said resource to said position close to said boundary of said visual representation of said resource;

responsive to said detecting said second movement to said position close to said boundary, determining said exclusion control requirement does not indicate exclusion based on said second attribute or based on a state of one or more other entities associated with said exclusion control requirement;

determining said second entity is permitted to access said resource based on said exclusion control requirement not indicating exclusion; and permitting a movement in said display of said visual representation of said second entity across said boundary of said visual representation of said resource and permitting a placement in said display of said visual representation of said second entity within said boundary of said visual representation of said resource based on said second entity determined to be permitted to access said resource.

11. The program product of claim 7, wherein said method further comprises:

initiating said display further including a visual representation of a second resource;

receiving an assignment of a second access control requirement to said visual representation of said second resource, rendering said visual representation of said resource as a first geometric shape having a first color;

rendering said visual representation of said second resource as a second geometric shape having a second color, wherein said first geometric shape and said second geometric shape are of a same type of shape if said resource and said second resource are of a same type of resource, wherein said first geometric shape and said second geometric shape are of different types of shapes if said resource and said second resource are of different types of resources, wherein said first color indicates said access control requirement, and wherein said second color indicates said second access control requirement.

12. The program product of claim 7, wherein said method further comprises:

rendering said visual representation of said resource as a first geometric shape having an area within said boundary into which a maximum of N visual representations of N entities fit, wherein N is greater than or equal to 1;

detecting N placements of said maximum of said N visual representations of said N entities within said area of said first geometric shape;

detecting a movement in said display of an (N+1)-th visual representation of an (N+1)-th entity to said position close to said boundary;

determining said (N+1)-th visual representation of said (N+1)-th entity does not fit into said area that includes said maximum of said N visual representations of said N entities;

determining said (N+1)-th entity is not permitted to access said resource based on said (N+1)-th entity not fitting into said area that includes said maximum of said N visual representations of said N entities; and preventing a placement in said display of said (N+1)-th visual representation of said (N+1)-th entity within said area based on said (N+1)-th entity determined to be not permitted to access said resource.

13. A process for supporting computing infrastructure, said process comprising providing at least one support service for at least one of creating, integrating, hosting, maintaining, and deploying computer-readable code in a computer comprising a central processing unit (CPU), wherein said CPU carries out instructions contained in said code causing said computer to perform a method of controlling access to an information technology (IT) resource, wherein said method comprises:

said computer initiating a display including a visual representation of said resource and a visual representation of a first entity;

said computer receiving an assignment of an access control requirement to said visual representation of said resource;

said computer receiving an assignment of a first attribute to said visual representation of said first entity;

said computer detecting a movement in said display of said visual representation of said first entity from outside a boundary of said visual representation of said resource to a position close to said boundary of said visual representation of said resource;

responsive to said detecting said movement to said position close to said boundary, said computer determining said first attribute assigned to said visual representation of said first entity satisfies said access control requirement assigned to said visual representation of said resource;

said computer determining said first entity is permitted to access said resource based on said first attribute assigned to said visual representation of said first entity satisfying said access control requirement assigned to said visual representation of said resource;

said computer permitting a movement in said display of said visual representation of said first entity across said boundary of said visual representation of said resource and permitting a placement in said display of said visual representation of said first entity within said boundary of said visual representation of said resource based on said first entity determined to be permitted to access said resource;

said computer initiating said display further including a visual representation of a second entity;

said computer receiving an assignment of an exclusion control requirement to said visual representation of said resource;

said computer receiving an assignment of a second attribute to a visual representation of a second entity;

said computer detecting a second movement in said display of said visual representation of said second entity from outside said boundary of said visual representation of said resource to said position close to said boundary of said visual representation of said resource;

responsive to said detecting said second movement to said position close to said boundary, said computer determining said exclusion control requirement indicates exclusion based on said second attribute or based on a state of one or more other entities associated with said exclusion control requirement;

said computer determining said second entity is not permitted to access said resource based on said exclusion control requirement indicating exclusion; and said computer presenting a visual cue in said display and optionally presenting a notification based on said second entity determined to be not permitted to access said resource, wherein said visual cue and said notification indicate to a user that said second entity is not permitted to access said resource.

14. The process of claim 13, wherein said method further comprises:

said computer initiating said display further including a visual representation of a second entity;

said computer receiving an assignment of a second attribute to a visual representation of a second entity;

said computer detecting a second movement in said display of said visual representation of said second entity from outside said boundary of said visual representation of said resource to said position close to said boundary of said visual representation of said resource;

responsive to said detecting said second movement to said position close to said boundary, said computer determining said second attribute assigned to said visual representation of said second entity does not satisfy said access control requirement assigned to said visual representation of said resource;

said computer determining said second entity is not permitted to access said resource based on said second attribute assigned to said visual representation of said second entity not satisfying said access control requirement assigned to said visual representation of said resource; and said computer presenting a visual cue in said display and optionally presenting a notification based on said second entity determined to be not permitted to access said resource, wherein said visual cue and said notification indicate to a user that said second entity is not permitted to access said resource.

15. The process of claim 14, wherein said presenting said visual cue includes preventing a placement in said display of said visual representation of said second entity within said boundary of said visual representation of said resource.

16. The process of claim 13, wherein said method further comprises:

said computer initiating said display further including a visual representation of a second entity;

said computer receiving an assignment of an exclusion control requirement to said visual representation of said resource;

said computer receiving an assignment of a second attribute to a visual representation of a second entity;

said computer detecting a second movement in said display of said visual representation of said second entity from outside said boundary of said visual representation of said resource to said position close to said boundary of said visual representation of said resource;

responsive to said detecting said second movement to said position close to said boundary, said computer determining said exclusion control requirement does not indicate exclusion based on said second attribute or based on a state of one or more other entities associated with said exclusion control requirement;

said computer determining said second entity is permitted to access said resource based on said exclusion control requirement not indicating exclusion; and said computer permitting a movement in said display of said visual representation of said second entity across said boundary of said visual representation of said resource and permitting a placement in said display of said visual representation of said second entity within said boundary of said visual representation of said resource based on said second entity determined to be permitted to access said resource.

17. The process of claim 13, wherein said method further comprises:

said computer initiating said display further including a visual representation of a second resource;

said computer receiving an assignment of a second access control requirement to said visual representation of said second resource, said computer rendering said visual representation of said resource as a first geometric shape having a first color;

said computer rendering said visual representation of said second resource as a second geometric shape having a second color, wherein said first geometric shape and said second geometric shape are of a same type of shape if said resource and said second resource are of a same type of resource, wherein said first geometric shape and said second geometric shape are of different types of shapes if said resource and said second resource are of different types of resources, wherein said first color indicates said access control requirement, and wherein said second color indicates said second access control requirement.

* * * * *